(12) United States Patent
Kim et al.

(10) Patent No.: US 11,531,837 B2
(45) Date of Patent: Dec. 20, 2022

(54) QUERY IMAGE SYNTHESIS FOR IMAGE RETRIEVAL SYSTEMS BASED ON DATA AUGMENTATION TECHNIQUES

(71) Applicant: SAP SE, Walldorf (DE)

(72) Inventors: Sohyeong Kim, Berlin (DE); Ying Jiang, Berlin (DE); Cordula Guder, Berlin (DE)

(73) Assignee: SAP SE, Walldorf (DE)

( * ) Notice: Subject to any disclaimer, the term of this patent is extended or adjusted under 35 U.S.C. 154(b) by 340 days.

(21) Appl. No.: 16/932,130

(22) Filed: Jul. 17, 2020

(65) Prior Publication Data
US 2022/0019849 A1 Jan. 20, 2022

(51) Int. Cl.
*G06K 9/62* (2022.01)
*G06K 9/00* (2022.01)
*G06F 16/535* (2019.01)
*G06N 20/00* (2019.01)
*G06T 7/90* (2017.01)

(52) U.S. Cl.
CPC ......... *G06K 9/6256* (2013.01); *G06F 16/535* (2019.01); *G06K 9/00503* (2013.01); *G06K 9/6232* (2013.01); *G06N 20/00* (2019.01); *G06T 7/90* (2017.01)

(58) Field of Classification Search
CPC ............. G06K 9/6256; G06K 9/00503; G06K 9/6232; G06F 16/535; G06F 16/583; G06N 20/00; G06N 3/08; G06T 7/90; G06T 2207/10024; G06T 7/194; G06T 11/00; G06V 10/774
See application file for complete search history.

(56) References Cited

U.S. PATENT DOCUMENTS

| | | | | |
|---|---|---|---|---|
| 10,049,308 | B1* | 8/2018 | Dhua | G06K 9/6256 |
| 2019/0026906 | A1* | 1/2019 | Kawai | G06K 9/6256 |
| 2020/0327662 | A1* | 10/2020 | Liu | G06T 7/10 |
| 2021/0333983 | A1* | 10/2021 | Singh | G06F 3/0482 |

(Continued)

OTHER PUBLICATIONS

Hinterstoisser, S. et al., "On Pre-Trained Image Features and Synthetic Images for Deep Learning," arXiv:1710.10710v1, Oct. 29, 2017, (9 Pages).

(Continued)

*Primary Examiner* — Christopher M Brandt
(74) *Attorney, Agent, or Firm* — Mintz Levin Cohn Ferris Glovsky and Popeo, P.C.

(57) ABSTRACT

Methods, systems, and articles of manufacture, including computer program products, are provided for synthesizing images for machine learning. The method may include selecting one or more image preprocessing transformations to apply on the foreground object image; applying the selected one or more image preprocessing transformations to the foreground object image; selecting a background image from a set of background images depicting a variety of different backgrounds which may be associated with the foreground object image; merging the selected background image with the foreground object image to form a synthesized image; selecting one or more image transformations to apply on the synthesized image; applying the selected one or more image transformations to the synthesized image; and storing the synthesized image in a collection of synthesized images to train a machine learning model.

20 Claims, 9 Drawing Sheets

(56) References Cited

U.S. PATENT DOCUMENTS

2021/0342638 A1* 11/2021 Ghesu ...................... G06T 5/50
2021/0390407 A1* 12/2021 Casser ................... G06N 3/088

OTHER PUBLICATIONS

Goyal, M. et al., "Dataset Augmentation with Synthetic Images Improves Semantic Segmentation," arXiv:1709.00849v3, Jun. 26, 2018, (13 pages).

Tremblay, J. et al., "Training Deep Networks with Synthetic Data: Bridging the Reality Gap by Domain Randomization," arXiv:1804.06516v3, Apr. 23, 2018, (9 pages).

* cited by examiner

QUERY IMAGE SYNTHESIS FOR IMAGE RETRIEVAL SYSTEMS BASED ON DATA AUGMENTATION TECHNIQUES

TECHNICAL FIELD

The present disclosure generally relates to machine learning.

BACKGROUND

Image search refers to searching for images based on the content of the image. For example, content-based image retrieval (also known as query by image content and content-based visual information retrieval) refers to a search for images that are similar in content to a query image. The content based search analyzes the contents of the image rather than textual metadata associated with the image. The content for the image search may rely on color, shape, texture, or any other information derived from the image itself.

SUMMARY

Methods, systems, and articles of manufacture, including computer program products, are provided for synthesizing images for machine learning. The method may include selecting one or more image preprocessing transformations to apply on the foreground object image; applying the selected one or more image preprocessing transformations to the foreground object image; selecting a background image from a set of background images depicting a variety of different backgrounds which may be associated with the foreground object image; merging the selected background image with the foreground object image to form a synthesized image; selecting one or more image transformations to apply on the synthesized image; applying the selected one or more image transformations to the synthesized image; and storing the synthesized image in a collection of synthesized images to train a machine learning model to identify, from a plurality of catalog images, one or more catalog images that match a query image received from a user.

In some variations, one or more of the features disclosed herein including the following features can optionally be included in any feasible combination.

The one or more image preprocessing transformations may include one or more of the following: varying a color of the foreground object image, varying a brightness of the foreground object image, varying a contrast of the foreground object image, rotating the foreground object image, scaling a size of the foreground object image, varying a transparency of the foreground object image, and blurring the foreground object image. The merging may include placing, within the background image, the foreground object image at a selected position, orientation, and/or point of view. The one or more image transformations may include one or more of the following: varying a color of the synthesized image, varying a brightness of the synthesized image, varying a contrast of the synthesized image, blurring at least a portion of the synthesized image, and applying a light filter. The machine learning model may be trained based on the synthesized images. The machine learning model may be provided to an image search system. A query including an image depicting an item may be received from a user equipment. An image search may be performed for one or more catalog images that match the image of the received query. The machine learning model may be trained, based on the collection of synthesized images, to identify the one or more catalog images and/or to respond to the query by providing the one or more catalog images to the user equipment. The foreground object image may be extracted from a catalog image received from a database including the plurality of catalog images.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing multi-language support for machine learning enabled text analysis, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

Images search and retrieval may be used not only in an e-commerce setting but also in many other industries that involve a large set of items that can be retrieved based on visual content. For example, a user equipment, such as a smartphone, a digital camera coupled to a computer, and/or the like, may be used by a user to capture an image including item. The user equipment may send a query including the image depicting the item to a server. This server may include, or be coupled to, an image search system that retrieves, based on image content, images (or, e.g., catalog images) depicting items that are visually similar to the query image item.

For example, a user's smartphone may take a picture of an item, such as a red pair of sneakers, and may then send to the image search system a query including the image depicting the item. In some instances, the image search system may preprocess the image by, for example, segmenting out the item (which in this example is a red sneaker) from the background, so that only the item is depicted in the image, although segmentation may be performed at other devices (e.g., a user equipment) or segmentation may not be performed at all on the image of the query. The image search system may search, based on the image, a database for other images that are visually similar to the query image. The visually similar catalog images may be retrieved from the database and returned as a response to the query. Referring to the red sneaker example, the image search system may query a database including catalog images for one or more catalog images that are visually similar to the query image depicting the red sneaker. If one or more similar catalog images are found, these catalog images are retrieved from the database and returned as a response to the query.

Figure 1:
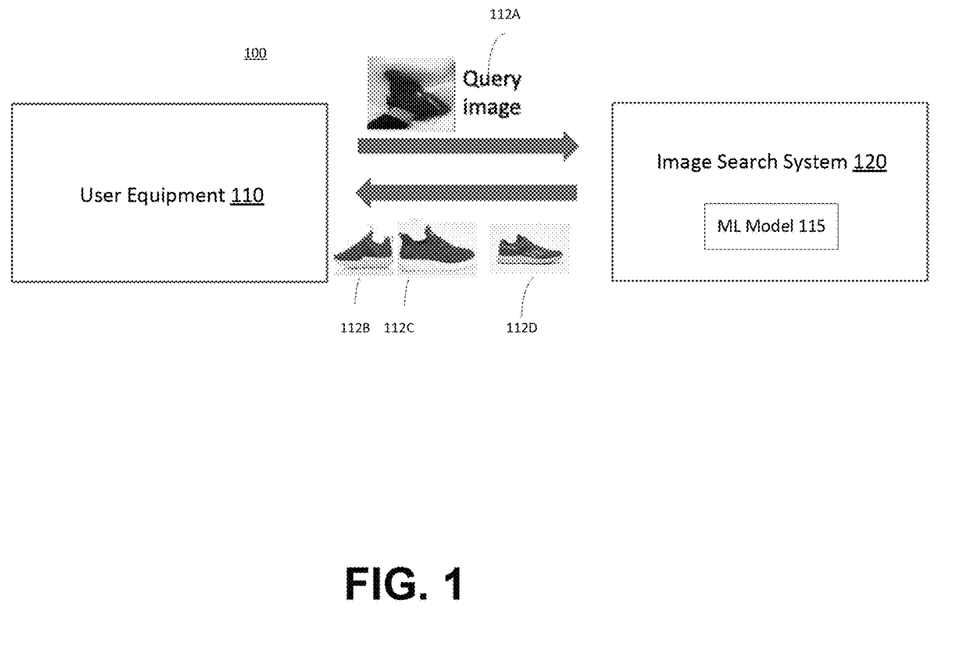
FIG. 1 depicts an example of a system including an image search system, in accordance with some example embodiments.

FIG. 1 depicts an example of a system 100 including a user equipment 110. The user may use the user equipment 110, such as a smartphone, to capture an image of a red sneaker. This image 112A (also referred to as a query image) is sent as a query to the image search system (also referred to as an image retrieval system) 120.

Although the previous example describes the user equipment capturing an image of the item, the image may come from other sources as well (e.g., an image stored on the user equipment, an image store in the cloud, an image provided by another user, an image captured from a third party website, and the like).

When the image search system 120 receives the query image 112A, the image search system may preprocess the image, if not already preprocessed. Next, the image search system may perform a search for catalog images (which may be stored in a database coupled to the image search system) depicting items that are visually similar to the item depicted in the query image 112A. As noted, the search and matching may be performed in the image domain based on visual aspects of the content of the query image, rather than textual searching of for example metadata. To illustrate further, the image search system 120 may use machine learning (including image processing and/or computer vision based technologies) to find catalog images that match (e.g., same or similar). In the example of FIG. 1, the image search system may respond to the query 112A with a query response including one or more similar catalog images 112B-D.

The image search system's 120 machine learning model 115 may be trained to identify catalog images of items that are visually similar to the item depicted in the query image. For example, a machine learning model 115, such as a neural network, a deep learning neural network, a nearest neighbor classifier, and/or the like, may be trained to identify catalog images depicting items that are visually similar to the item depicted in the query image. The images needed to train the machine learning (ML) model 115 to perform this task may be difficult to obtain, not available, and/or too small a dataset to train the ML model to accurately perform the task. To illustrate, a database of catalog images may only include a single image for each item. The single image of a given item may be insufficient to train a ML model, such as ML model 115, to recognize that a query image matches (e.g., is the same or similar to) one or more catalog images.

In some example embodiments, there is provided a way to synthesize large quantities of images for use in training the ML model 115. The synthesized images may then be used, alone or in combination with other images, to train the ML model of an image search system. In this way, the ML model may be trained even when there are few or no images to robustly train the ML model to identify matching images as part of an image search.

To generate the synthetic images, two sets of images may be used. The first set of images may comprise catalog images of at least some of the items which are to be identified by the image search system. For example, the catalog images may correspond to one or more of the items available at an e-commerce website, items in a company's inventory, and the like. The second set of images may include a set of different types of background images (which can be a smaller quantity of images when compared to the first set).

Figure 2:
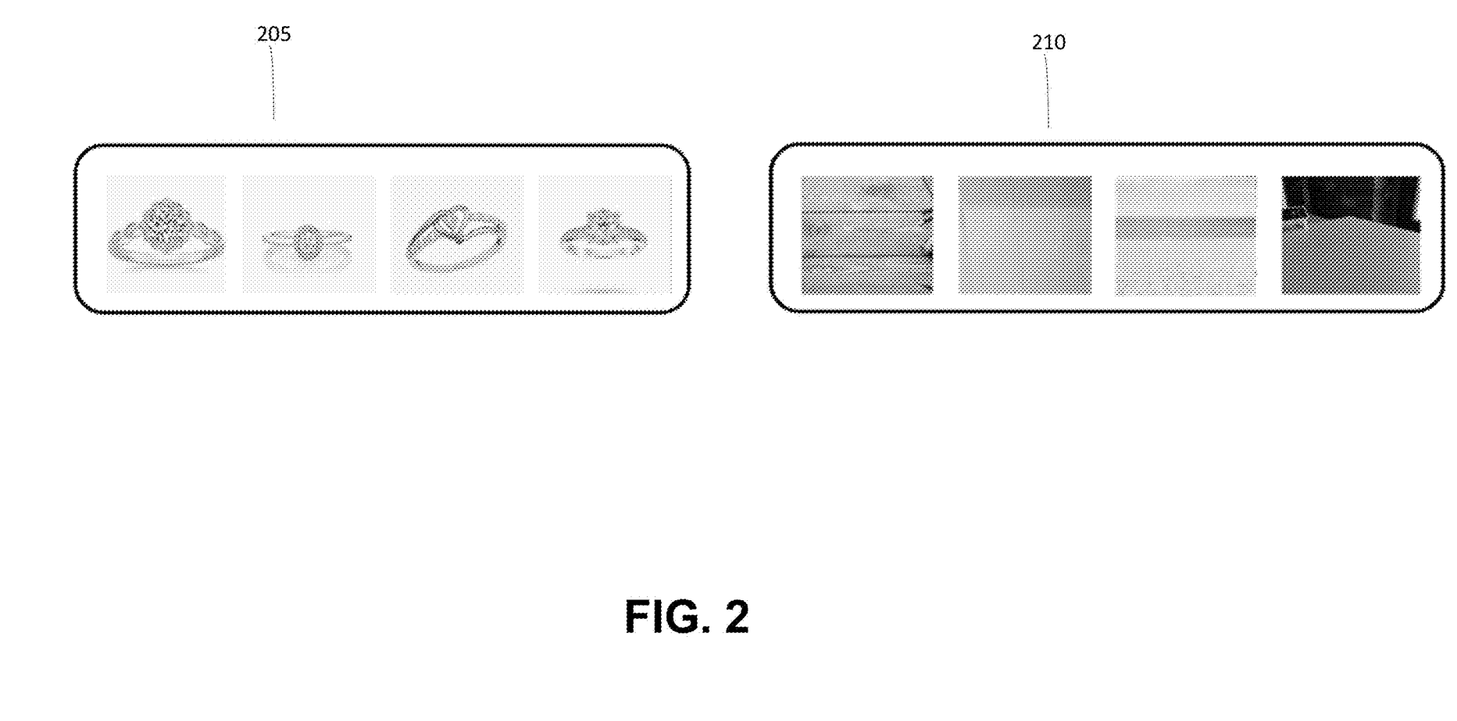
FIG. 2 depicts examples of catalog images and background images, in accordance with some example embodiments.

FIG. 2 depicts an example of the first set of catalog images 205. The catalog images 205 may be professionally taken, high-quality images of items. In some instances, the catalog images may be pre-processed or sanitized images having, for example, a controlled background (e.g., transparent, white, or solid color background), proper lighting, and a certain view point as shown in the example of FIG. 2 (where the diamond rings are depicted from the same or similar view showing the diamond). As noted, the catalog images may represent the kind of images used by a company for presentation of the items, such as products, on a company website, internal inventory control, or other purposes. To illustrate with an e-commerce website example, the catalog items may include catalog images of some of the items available through the e-commerce web site. In the example of FIG. 2, the catalog images are images of rings, such as diamond rings, although other types of catalog images may be used as well.

FIG. 2 also depicts the second set of background images 210. The background images may be taken with a camera, collected from the web to mimic an environment where the user might be taking a query image, and/or the like.

In the example of FIG. 2, the background images 210 are images depicting different types of background images, such as wood flooring, a plain white background, a sandy beach, a desk, or other possible backgrounds that a user might capture while taking a picture of one of the items 205. The variety of backgrounds 210 enables the synthesized images depicting an item, such as a diamond, to have a variety of different backgrounds. This variety in the synthesized images enables the machine learning model to train to identify the catalog image of the item from a variety of query images which may be provided by a user. For example, if a user captures a picture of a diamond while seated at a desk, the query image will have the diamond in the foreground and the desk as the background, for example. Having a variety of different backgrounds in the synthesized images of the diamond enables more robust (e.g., under varied background images) training of the machine learning model. In this way, the trained machine learning model is more likely to find catalog images that are similar to the query image depicting the diamond in the foreground and the desk as the background. Although 210 depicts 4 different backgrounds, these are merely examples as other types and quantities of backgrounds may be used as well.

Figure 3:
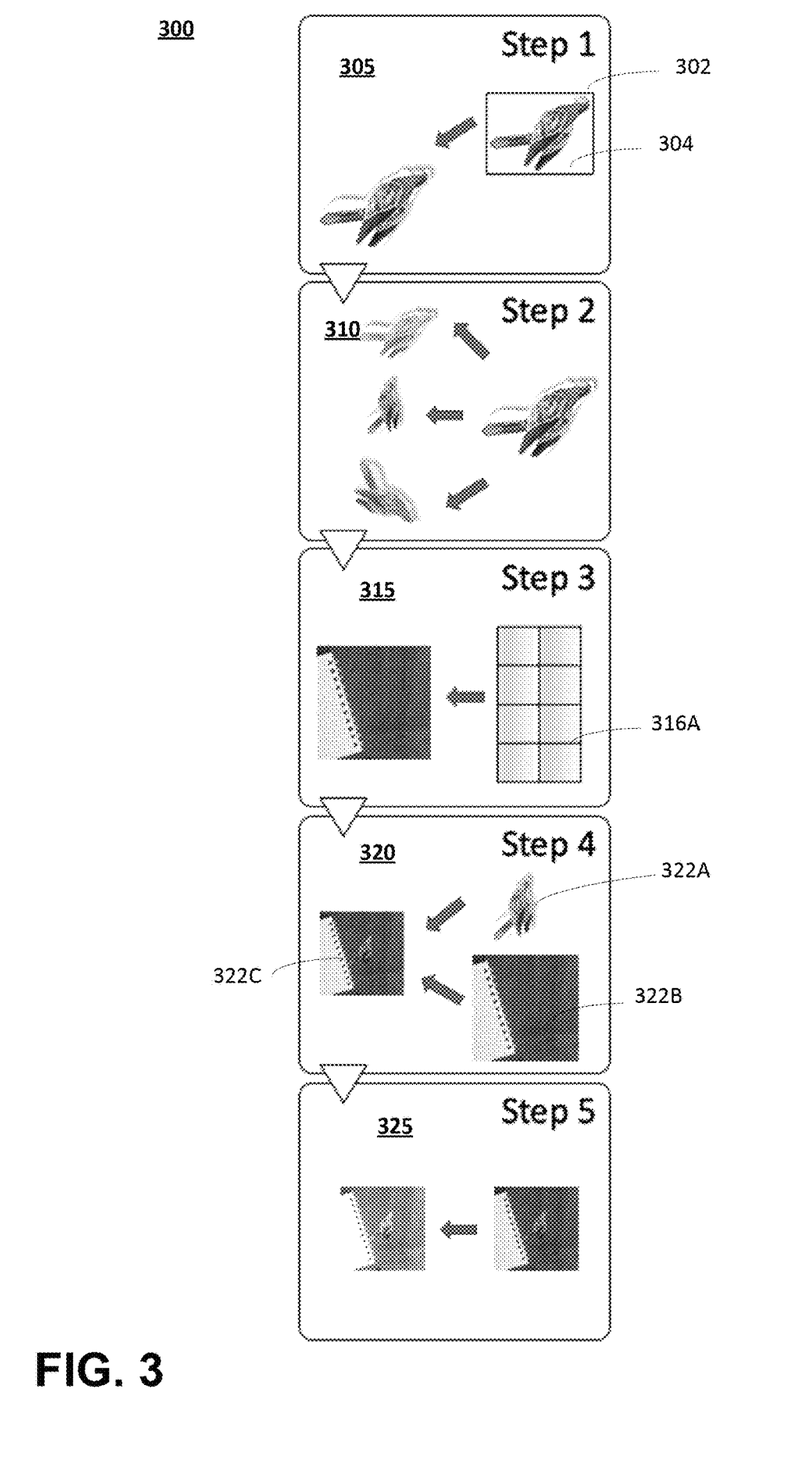
FIG. 3 depicts a process for synthesizing training images for a machine learning model, in accordance with some example embodiments.

FIG. 3 depicts an example of a process 300 for generating synthetic images for training a machine learning model, in accordance with some example embodiments. The description of FIG. 3 also refers to FIG. 1.

At 305, a foreground object may be extracted from a catalog image. For example, the synthesized image generator may extract from a catalog image a foreground object, such an item. The synthesized image generator may perform segmentation to remove the background from the item. In the example of FIG. 3, the catalog image 302 includes a bird in the foreground which is segmented from the solid white background 304. If the background of the catalog image is transparent or the foreground image (of the bird, for example) is already segmented, this step may be skipped. In some implementations, the synthesized image generator may perform other image processing operations on the extracted image of the bird including cropping the extracted item. For example, the synthesized image generator may use pixel based thresholding, edge detection, histogram based techniques, and/or other image processing techniques to segment the item of interest, such as the bird in the foreground from the background.

At 310, one or more image preprocessing (e.g., data augmentation) techniques may be performed on the extracted foreground object. For example, the synthesized image generator may perform preprocessing. This preprocessing may include one or more transformations of the image of the foreground object, which in this example is a bird. The one or more image preprocessing transformations may include rotating the foreground object, scaling the size of the foreground object, varying the transparency of the foreground object, blurring the foreground object, and/or projection transformation (e.g., a projection matrix which maps three-dimensions points onto a two-dimensional plane). In some embodiments, these transformation may be performed at random, in a pseudo random manner, or in a deterministic way so that each time the process 300 the visual appearance of the foreground object within the background is varied. For example, a first time process 300 is run, the synthesized image generator may rotate the bird at 302 by 5 degrees, scale the size of the bird so that it is 10% smaller, vary the transparency of the bird so that it is 90% transparent, and so forth when generating a synthesized image. And, a second time process 300 is run, the synthesized image generator may rotate the bird at 302 by 15 degrees, scale the size of the bird so that it is 2% smaller, vary the transparency of the bird so that it is 10% transparent, and so forth so that each time the process is run it generates another variation of the synthesized image. To illustrate further, the synthesized image generator may select a rotation from a list of 10 different rotation angles, may select transparent from a list of 10 different degrees of transparency, may select scaling from a list of 10 different values of scaling, and may select from 10 different choices of projection matrix. The variations in the values for rotation, scaling, and the like can enhance the robustness of the synthesized images which are ultimately generated.

The preprocessing at 310 may also include varying the color of the foreground object, varying the brightness of the foreground object, and/or varying the contrast of the foreground object. And, this preprocessing may also be performed at random, pseudo random, or deterministic manner to vary the visual appearance of the foreground object, so that each time the process 300 is run the visual appearance with respect to color, brightness, and/or contrast of the foreground object within the background is varied. For example, a first time process 300 is run, the synthesized image generator may select a first value for each of the color, brightness, and/or contrast of the foreground object, a second time process 300 is run, the synthesized image generator may select a value for each of the color, brightness, and/or contrast of the foreground object, and so forth each time the process is run to generate another synthesized image with variations in color, brightness, and/or contrast of the foreground object. By way of another example, the synthesized image generator may select a select a value of color from a list of 10 different colors, may select a brightness from a list of 10 different brightness values, and select a value of contrast from a list of 10 different contrast values. These variations in the values of color, brightness, and/or contrast can enhance the robustness of the synthesized images which are ultimately generated.

The variation in color in the synthesized images enables the machine learning model to train so that it returns items of similar (but not necessarily the same) color. For example, when a user sends a query image of a faded, dirty pair of red sneakers, the trained machine learning model should be able to return a catalog image of new red sneakers even though the new sneakers and the old ones do not have an identical color (as the query image's red sneakers are faded, dirty and as such not be a perfect color match to the catalog image of the new red sneakers). Moreover, variations in color may be caused by lighting conditions. For example, the catalog images may be taken in fixed or controlled lighting conditions, such as under a cool light as in daylight conditions, but the query images may be taken indoors under a warm light (e.g., a standard light bulb). This different in lighting may cause differences in colors between the catalog image and the query image. For example, the catalog image will be more blueish, when compared to the query image which will be more yellowish in this example. Although these color differences may not be apparent to a user/humans, these differences may make a significant difference to machine learning model. When using color variation, the machine learning model may be trained to not pay attention to these slight changes in color. As noted below, the degree to which the machine learning model learns to ignore color differences may be controlled by the degree of color variation that is applied to the synthesized images (which may depend on the desired machine learning model behavior and may be use-case specific).

By applying stronger color scheme changes across a plurality of images containing the foreground object for example, the ML model 115 may be made less sensitive to color and lighting differences when identifying catalog images. Specifically, the stronger the color augmentation among the synthesized images, the more the machine learning model will learn to ignore the color and focus on the shape of the item rather than on the color. Alternatively, by applying less color scheme changes across a plurality of synthesized images of the foreground object for example, the machine learning model 115 may be made more sensitive to color when identifying catalog images by learning to focus on the color. The foreground object's brightness and/or the contrast may be varied in a similar way (as color) to train the ML model to be more or less sensitive to brightness and/or contrast. In this way, the preprocessing at 310 may be used to fine tune the training of the ML model to a specific use case.

In some implementations, changing the color scheme of the foreground objects may be especially useful for image retrieval. The machine learning model may, as noted, be trained so that it is less sensitive to color differences. When this is the case, the machine learning model may, as noted above, identify a catalog image as being the same as the query image even if the color of the item in the query image and catalog image is different. Alternatively, the machine learning model may be trained so that it is sensitive to color differences. When this is the case, the machine learning model may identify a catalog image as being the same as the query image when the colors are the same. The process 300 may thus enable training for specific use cases.

At 315, a background image may be selected from set of background images. For example, the synthesized image generator may select a background image 316A from the plurality of background images 316B. In some embodiments, the synthesized image generator may select the image 316B at random, pseudo random, or deterministic manner to vary the background images used with the foreground object. As noted, the plurality of background images enable the ML model to train, so that it can identify the catalog image of the item from a variety of query images having varied backgrounds. This variation in the background of the synthesized images makes it more likely that the trained machine learning model will find the correct catalog images given a query image. Although 315 depicts 8 different backgrounds, these are merely examples as other types and quantities of backgrounds may be used as well.

At 320, the background image 322B (which was selected at 315) is merged with the foreground object 322A to form a synthesized image 322C. For example, the synthesized image generator may merge the foreground object 322A and background image 322B to form the synthesized image 322C. As part of the merging, the synthesized image generator may select a position of the foreground image within the background image, an orientation of the foreground object (e.g., a rotation of the foreground object within the background image if not previously determined at 310), and/or a point of view of the foreground object within the background image. And, this selection of the position, orientation, and point of view may be selected randomly, pseudo-randomly, or in a deterministic manner.

At 320, the synthesized image generator may perform additional image processing, such as changes to color, brightness, and contrast of the synthesized image 322C. And, the synthesized image generator may perform additional image processing (which may be applied randomly, pseudo-randomly, or deterministically) on the synthesized image 322C by blurring (e.g., motion blur) the merged image or changing lighting (or filters). The additional processing of the merged image may also be performed to make the background image and the foreground object visually more consistent, so that the merged image looks more realistic. The synthesized image may provide realistic looking images to provide the variations from catalog images to enable more robust training. At 320, a lighting filter may be selected from a set of predefined common lighting conditions (e.g., direct sunlight, fluorescent lamps, Tungsten light bulbs, etc.) and applied to the synthesized image. At 320, motion blur may, as noted, be selected and be applied to the synthesized image as well. Motion blur may be used to simulate the situation where a user takes a picture under bad lighting conditions (causing longer exposure time) and fails to keep the camera steady during exposure.

At 325, the synthesized image generator may store the synthesized image and repeat the process 300 for the catalog image(s) to obtain a variety of different synthesized query images. For example, the synthesized image generator may repeat process 300 for the catalog image of the bird to vary the background and other aspects (e.g., position of the bird within background image, orientation of the bird within background image, point of view of the bird within background image, lighting, color, contrast, brightness, blurring, filtering, and the like) to generate a plurality of synthesized images, one or more of which may be used to train a machine learning model. And, the synthesized image generator may repeat the process for each of the catalog items to generate a set of synthesized images for the item to enable training of a machine learning model. In some embodiments, the machine learning model is trained to recognize some (if not all) of the catalog items. In some embodiments, a plurality of machine learning models are trained. Each machine learning model trained to recognize a specific catalog image or a category (e.g., type) of catalog images.

The process 300 may be repeated to generate a robust set of synthesized images for the item (e.g., the bird) depicted in a variety of backgrounds, orientations, lighting, and the like. This robust set of synthesized images enables the machine learning model 115 to be trained in a training phase, so that he ML model can more accurately find catalog images that match a query image. And, the process 300 may be repeated to generate a plurality of synthesized images for training the ML model to recognize one or more of the items depicted by the catalog images.

In some embodiments, the image processing performed at 310 on the foreground object (e.g., the bird) is kept separate from the image processing performed at 320 on the merged, synthesized image. This separation may allow variations (e.g., in color, brightness, etc.) at 310 to the foreground object over a wide range, without introducing problems such as overexposure, which often appears in single stage enhancement. And, applying more global image enhancements at 320 to the merged, synthesized image enables synthesized image generation where the foreground object is more consistent in appearance with the background object. Furthermore, random blur may be applied to simulate motion blur, which does not occur in catalog images.

Figure 4A:
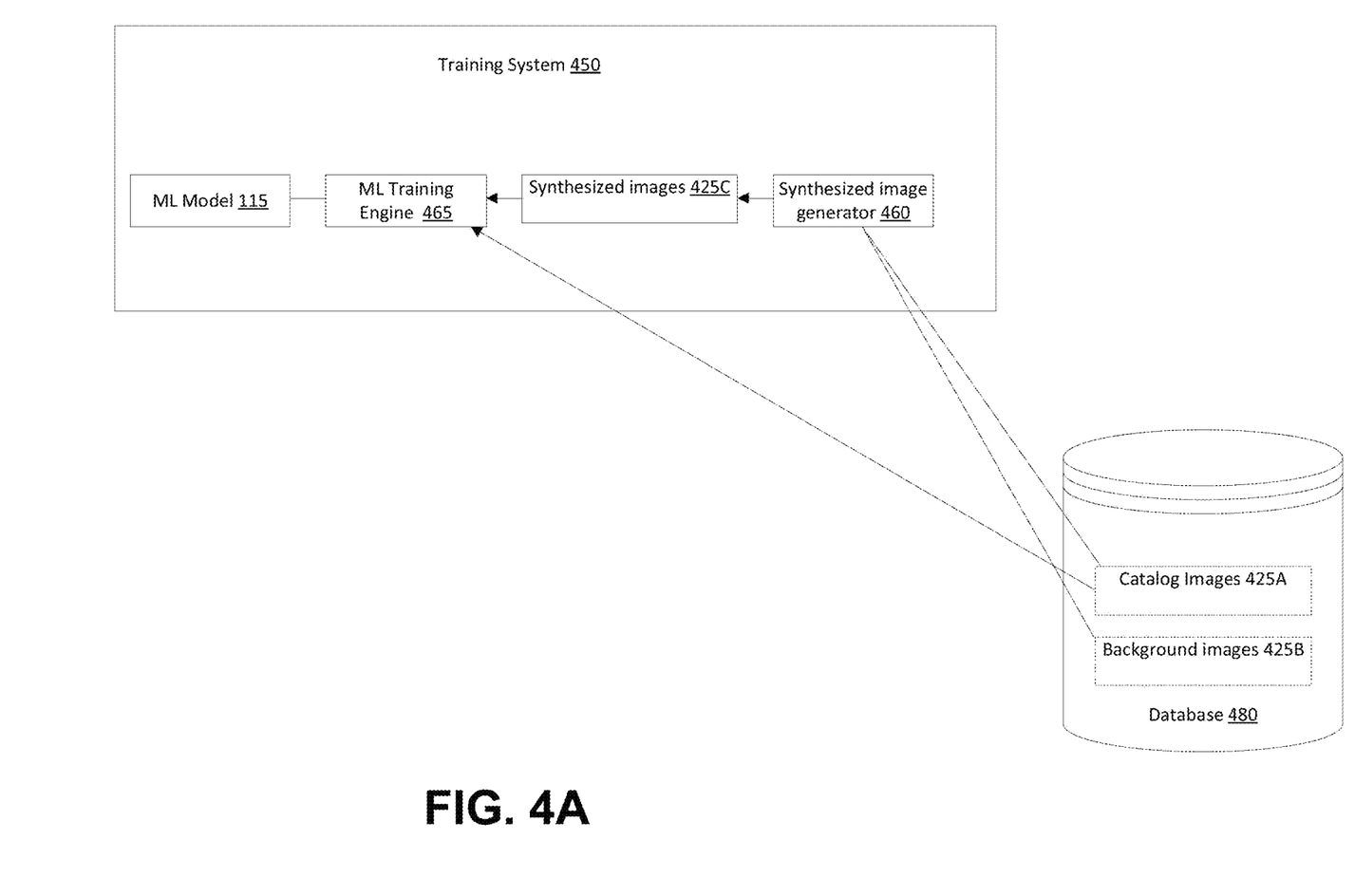
FIG. 4A depicts an example of a training system that uses synthesized images to train a machine learning model, in accordance with some example embodiments.

FIG. 4A depicts an example of a training system 450, in accordance with some example embodiments. The system may be used to train ML model 115 based on at least the synthesized images generated as noted with respect to process 300. In the example of FIG. 4A, the catalog images 425A and the background images 425B are stored in a persistent store, such as a database 480, which is coupled to the training system 450.

The synthesized image generator 460 may generate synthesized images 425C based on process 300 noted above.

Although the synthesized image generator 460 is depicted within the image training system 400, the synthesized image generator may be located at other devices as well (e.g., as a cloud-based service and the like).

The synthesized image generator 460 may access catalog images 425A and background images 425C to generate a plurality of synthesized images 425C by repeatedly executing process 300 as noted above. During a training phase of the machine learning model 115, the ML training engine 465 may use at least the synthesized images 425C to train the machine learning model 115. For example, the training images (which include at least the synthesized images) may be repeatedly presented at the input of the machine learning model until the machine learning model learns to properly match an item depicted in the synthesized image to one or more catalog images. If the machine learning model comprises a neural network for example, synthesized images containing birds may be presented at the input until the neural network learns (e.g., adjusts its weights) to properly identify the catalog images depicting a bird that is visually similar. Training the machine learning model may thus include minimizing an error in an output of the machine learning model, which may correspond to a difference between the labels the machine learning model assigns to a training sample and the ground-truth label associated with the training sample. The training of the ML model may be supervised where the machine learning learns a function that maps an input to an output (e.g., an input synthesized image depicting an item to an output label identifying a catalog image depicting a similar item). Alternatively, the training may be unsupervised. When the ML model is trained, the training system 450 may provide the trained ML model 115 for use by the image search system 120.

In some implementations, the training system 450 is separate from the image search system 120. For example, the training system 450 may be a service which generates synthesized images and/or trained ML models. In some implementations, the training system 450 is comprised in the image search system 120. In some embodiments, the synthesized image generator 460 generates a quantity of synthesized images, so that the ML model 115 can accurately be trained. For example, if the ML model does not converge or accurately recognize input images, the quantity of synthesized images may not be sufficient or the variation in the synthesized images may not be sufficient, in which case the synthesized image generator 460 may generate additional synthesized images to improve the training.

Figure 4B:
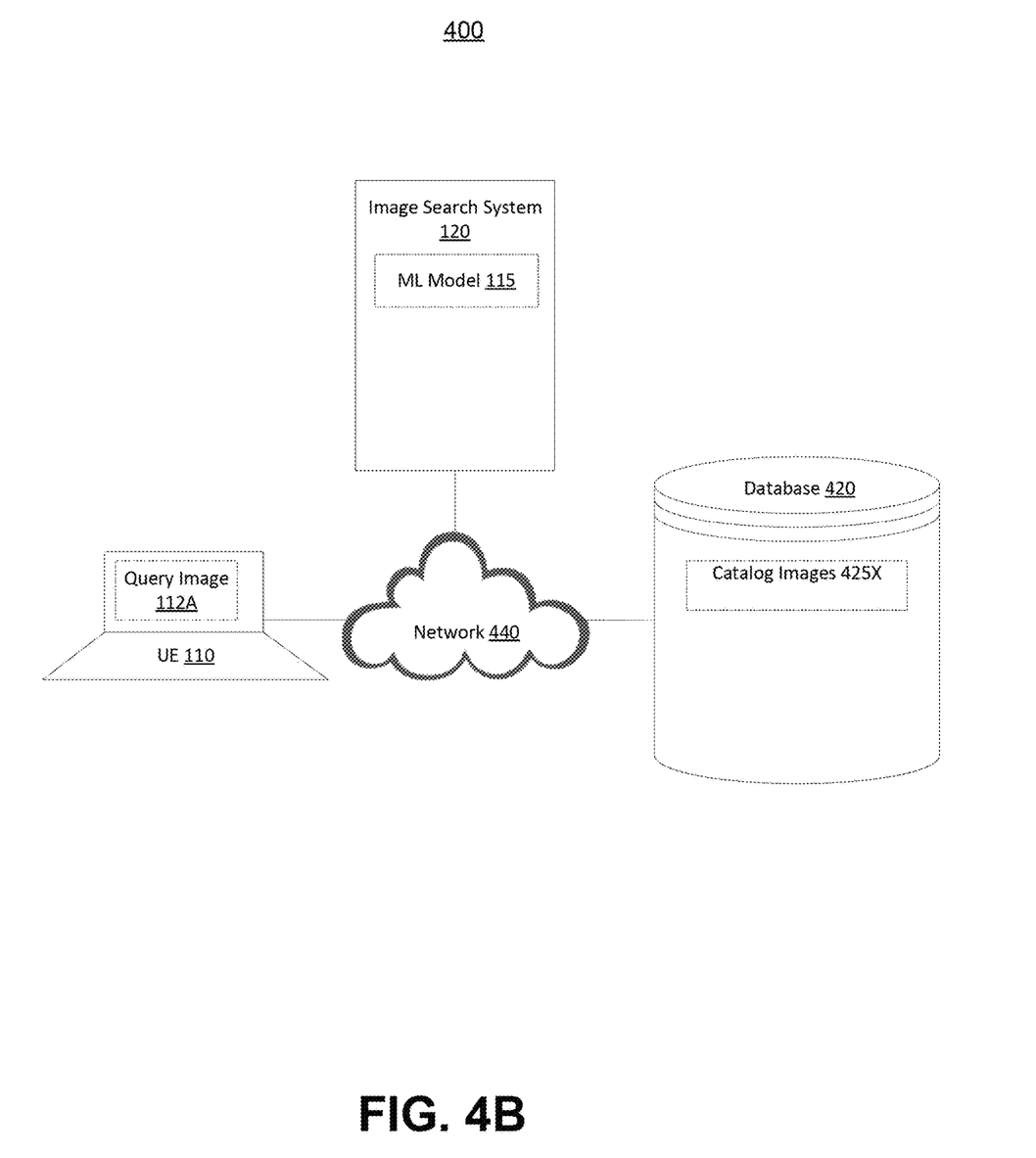
FIG. 4B depicts an example of an image search system including a machine learning model trained using synthesized images, in accordance with some example embodiments.

FIG. 4B depicts an example system 400 for identifying catalog images with a ML model trained using synthesized images, in accordance with some example embodiments.

The system may include a user equipment 110 including a user interface which may present a query image 112. The user equipment may comprise, or comprised in, a processor-based device including, for example, a smartphone, a computer, a tablet, a wearable apparatus, a virtual assistant, an Internet-of-Things (IoT) appliance, and/or the like. The user equipment may be coupled to the image search system 120 via network 440.

The database 420 may be a repository for electronic data including, for example, a relational database, an object oriented database, a non-relational database, and/or the like. The database 420 may store catalog images 425X. The catalog images 425X may be the same or similar to the catalog images 425A used to generate the plurality of synthesized images. And, the database 420 may be the same or a different database as database 480.

The network 440 may be a wired network and/or a wireless network including, for example, a wide area network (WAN), a local area network (LAN), a virtual local area network (VLAN), a public land mobile network (PLMN), the Internet, and/or the like.

The image search system 120 may include the trained machine learning model 115. The machine learning model 115 may be trained as noted above with respect to FIG. 4A. The training of the machine learning model may be based on synthesized images generated as noted above with respect to process 300.

In operation, when the user equipment 110 sends a query image 112A to the image search system 120, the machine learning model 115 identifies one or more catalog images 425X depicting an item that is similar to the item depicted in the query image 112A. For example, if the query image depicts an image of a red sneaker as shown at 112A (FIG. 1), the machine learning model (which was trained using the synthesized images in accordance with some example embodiments) identifies one or more catalog images depicting the same or similar red sneakers, such as the red sneaker images at FIG. 1 at 112B-D (which may be stored at database 420 as catalog images 425X). The image search system may then respond to the query with the identified catalog mages.

Figure 5:
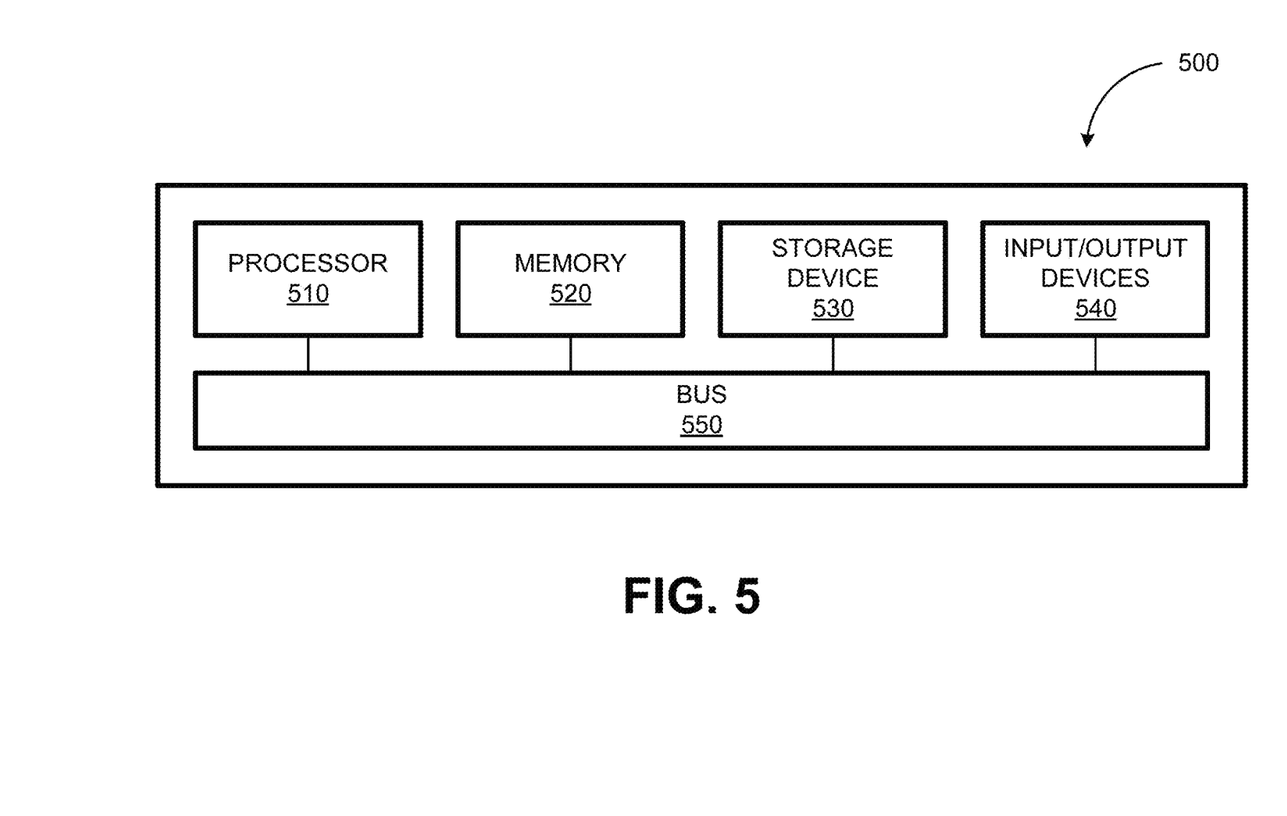
FIG. 5 depicts a block diagram illustrating a computing system, in accordance with some example embodiments.

FIG. 5 depicts a block diagram illustrating a computing system 500, in accordance with some example embodiments. Referring to FIGS. 1-4, the computing system 500 can be used to implement the image search system 120, the training system 450, the ML model 115, the synthesized image generator 460, the ML training engine 465, and/or any other devices or components disclosed herein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the text analysis engine 110. In some implementations of the current subject matter, the processor 510 can be a single-threaded processor. Alternately, the processor 510 can be a multi-threaded processor. Alternatively, or additionally, the processor 510 may be implemented as a graphic processor unit (GPU) or a specialized neural network chip as well. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

Figure 6A:
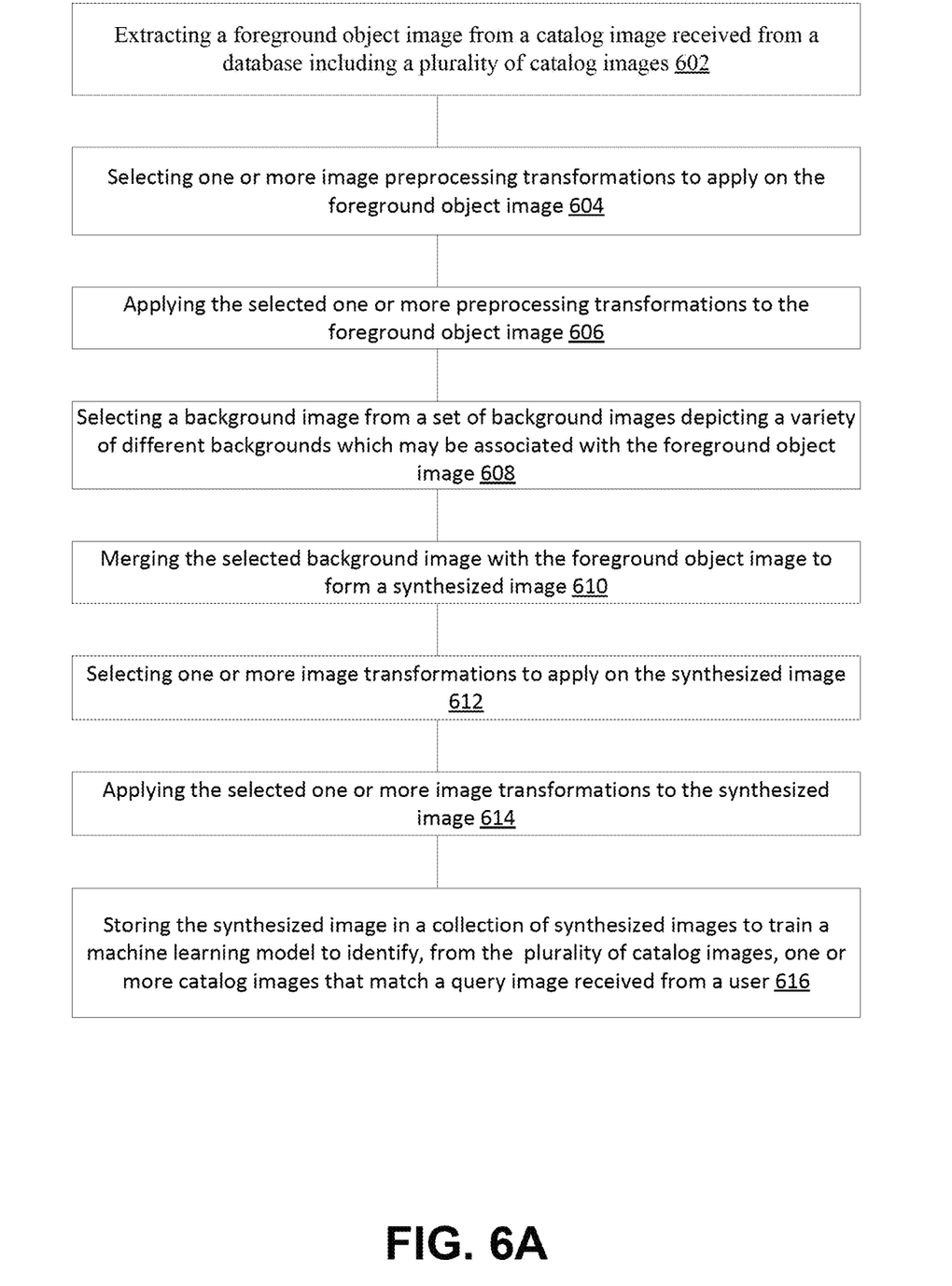
FIG. 6A depicts an example process for generating synthesized images, in accordance with some example embodiments.

FIG. 6A depicts an example of a process for generating synthesized images, in accordance with some example embodiments.

At 602, a foreground object image may be extracted from a catalog image received from a database including a plurality of catalog images. For example, the synthesized image generator 460 may extract a foreground object image, such as the bird, from the catalog image 302 depicting the bird. As noted, the extraction may be done by segmenting the foreground object from the background. If the catalog images have transparent backgrounds or the foreground images are already segmented, 602 may be skipped.

At 604, one or more image preprocessing transformations may be selected for application on the foreground object image. For example, the synthesized image generator 460 may select one or more of the following transformations: rotating the foreground object such as the bird of FIG. 3 at 310, scaling the size of the foreground object, varying the transparency of the foreground object, blurring the foreground object, projection transformation, varying the color of the foreground object, varying the brightness of the foreground object, and/or varying the contrast of the foreground object.

At 606, the selected one or more preprocessing transformations may be applied to the foreground object image. For example, the synthesized image generator 460 may apply the selected one or more preprocessing transformations to the foreground object image. To illustrate further, the synthesized image generator 460 may rotate the foreground object image (of the bird for example) by 3 degrees, scale the size of the foreground object image by 90%, vary the color of the foreground object by a certain amount, and/or vary the brightness of the foreground object by a certain amount.

At 608, a background image may be selected from a set of background images depicting a variety of different backgrounds which may be associated with the foreground object image. For example, the synthesized image generator 460 may select a background image from a set of background images as described above with respect to 315.

At 610, the selected background image is merged with the foreground object image to form a synthesized image. For example, the synthesized image generator 460 may merge the background image selected at 608 with the foreground object image. To illustrate further, the synthesized image generator may select a position of the foreground image object within the background image and insert the foreground image of the object as shown at 320.

At 612, one or more image transformations may be selected for application on the synthesized image. For example, the synthesized image generator may select one or more image processing transformation to be applied to the synthesized image. Examples of these transformation include changes to color, brightness, contrast, and/or blurring. And, the selected one or more image transformation are applied, at 614, to the synthesized image.

At 616, the synthesized image may be stored in a collection of synthesized images to enable training a machine learning model to identify, from the plurality of catalog images, one or more catalog images that match a query image received from a user. For example, the synthesized image generator may store the synthesized image in a persistent store to enable training. The process at FIG. 6A may be repeated to generate a plurality of synthesized images having variations in color, brightness, contrast, scale, transparency, rotation, and/or other aspect as noted herein.

Figure 6B:
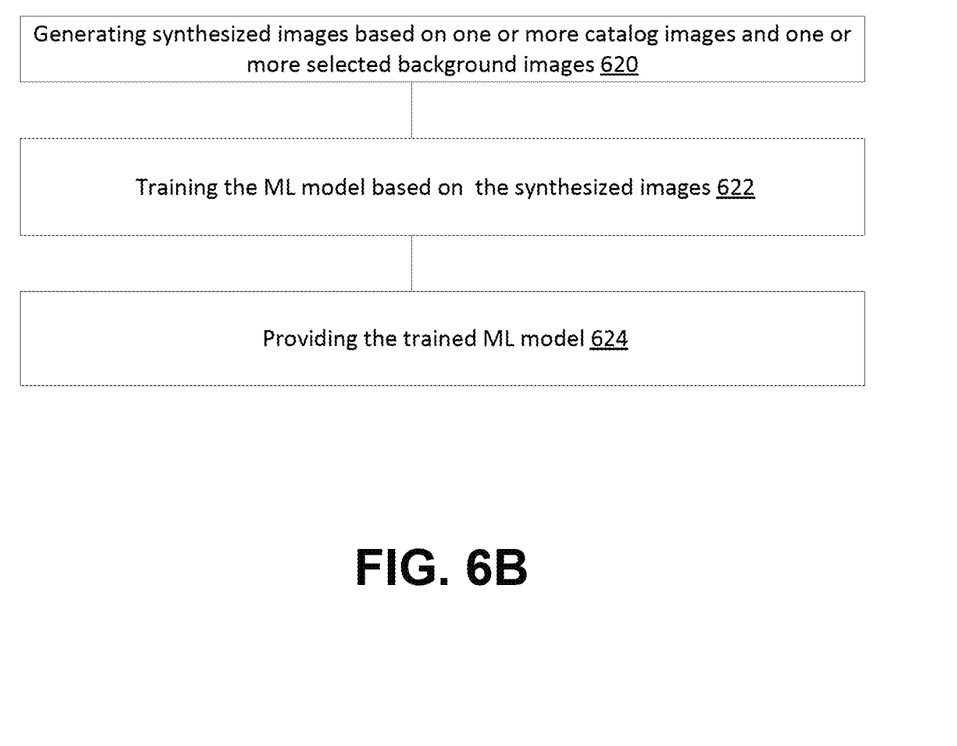
FIG. 6B depicts an example process for training a machine learning model based on synthesized images generated in accordance with some example embodiments.

FIG. 6B depicts an example process for training a machine learning model based on synthesized images, in accordance with some example embodiments.

At 620, synthesized images are generated based on one or more catalog images and one or more selected background images. The synthesized images may be generated as noted above with respect to FIG. 3 and/or FIG. 6A. In some embodiments, the synthesized image generator 460 (FIG. 4A) generates synthesized mages 425C which are then provided to the ML training engine 465 to enable training of the ML model 115.

At 622, the ML model is trained based on the synthesized images. For example, the ML training engine 465 may, as noted, use at least the synthesized images 425C to train the machine learning model 115. If the machine learning model comprises a neural network for example, the synthesized images of an item (e.g., the bird at FIG. 3) may be presented at the input until the neural network learns (e.g., adjusts its weights) to properly identify the catalog images depicting a bird that is visually similar. Training may be considered complete when the machine learning model converges to a threshold recognition error at the output.

At 624, the trained ML model may be provided. When the ML model 115 is trained, it may be stored for use or forwarded to a system, such as image search system 120, to identify catalog images given an input of a query image. Because the training process uses synthesized images have a robust variation (e.g., background, color, brightness, contrast, scale, transparency, rotation, and/or other aspects), the ML model may be better trained to recognize a catalog image that is similar to a query image, when compared to training the ML model only using a single catalog image, for example.

Figure 6C:
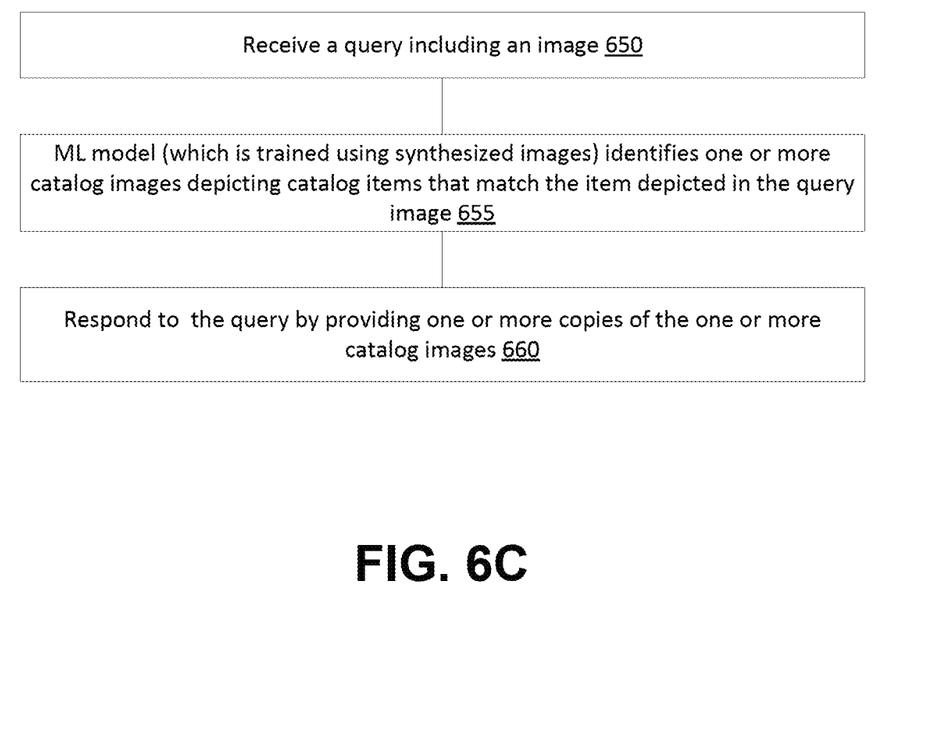
FIG. 6C depicts an example process for identifying, by a machine learning model trained based on synthesized images, one or more catalog images that match a query image, in accordance with some example embodiments.

FIG. 6C depicts an example process for identifying one or more catalog images that match a query image.

At 650, an image search system may receive, from a user equipment, a query including an image depicting an item. For example, the image search system 120 may receive from user equipment 110 a query including an image of an item, such as a bird, red sneaker, diamond, or any other type of object. The received query may be for an image search (e.g., a search of matching similar images which are identified based on image content).

At 655, a machine learning model (which is trained based on synthesized images) may identify one or more catalog images depicting one or more items that are visually similar to the item depicted by the query image. For example, the machine learning model 115 may be trained as described above at 300 using a plurality of synthesized images. The ML model may identify one or more catalog images that match the item depicted in the image received in the query. For example, ML model may find one or more catalog images depicting a bird which matches a query image depicting a bird. At 660, the image search system 120 may respond to the query by providing one or more copies of the one or more catalog images to the user equipment 110.

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   selecting one or more image preprocessing transformations to apply on the foreground object image;
   applying the selected one or more image preprocessing transformations to the foreground object image;
   selecting a background image from a set of background images depicting a variety of different backgrounds which may be associated with the foreground object image;
   merging the selected background image with the foreground object image to form a synthesized image;
   selecting one or more image transformations to apply on the synthesized image;
   applying the selected one or more image transformations to the synthesized image; and
   storing the synthesized image in a collection of synthesized images to train a machine learning model to identify, from a plurality of catalog images, one or more catalog images that match a query image received from a user.

2. The system of claim 1, wherein the one or more image preprocessing transformations include one or more of the following: varying a color of the foreground object image, varying a brightness of the foreground object image, varying a contrast of the foreground object image, rotating the foreground object image, scaling a size of the foreground object image, varying a transparency of the foreground object image, and blurring the foreground object image.

3. The system of claim 1, wherein the merging includes placing, within the background image, the foreground object image at a selected position, orientation, and/or point of view.

4. The system of claim 1, wherein the one or more image transformations include one or more of the following: varying a color of the synthesized image, varying a brightness of the synthesized image, varying a contrast of the synthesized image, blurring at least a portion of the synthesized image, and applying a light filter.

5. The system of claim 1 further comprising:
training the machine learning model based on the synthesized images.

6. The system of claim 1 further comprising:
providing the machine learning model to an image search system.

7. The system of claim 1 further comprising:
receiving, from a user equipment, a query including an image depicting an item.

8. The system of claim 7 further comprising:
performing an image search for one or more catalog images that match the image of the received query, wherein the machine learning model is trained based on the collection of synthesized images to identify the one or more catalog images; and
responding to the query by providing one or more copies of the one or more catalog images to the user equipment.

9. The system of claim 1, wherein the foreground object image is extracted from a catalog image received from a database including the plurality of catalog images.

10. A method comprising:
selecting one or more image preprocessing transformations to apply on the foreground object image;
applying the selected one or more image preprocessing transformations to the foreground object image;
selecting a background image from a set of background images depicting a variety of different backgrounds which may be associated with the foreground object image;
merging the selected background image with the foreground object image to form a synthesized image;
selecting one or more image transformations to apply on the synthesized image;
applying the selected one or more image transformations to the synthesized image; and
storing the synthesized image in a collection of synthesized images to train a machine learning model to identify, from a plurality of catalog images, one or more catalog images that match a query image received from a user.

11. The method of claim 10, wherein the one or more image preprocessing transformations include one or more of the following: varying a color of the foreground object image, varying a brightness of the foreground object image, varying a contrast of the foreground object image, rotating the foreground object image, scaling a size of the foreground object image, varying a transparency of the foreground object image, and blurring the foreground object image.

12. The method of claim 10, wherein the merging includes placing, within the background image, the foreground object image at a selected position, orientation, and/or point of view.

13. The method of claim 10, wherein the one or more image transformations include one or more of the following: varying a color of the synthesized image, varying a brightness of the synthesized image, varying a contrast of the synthesized image, blurring at least a portion of the synthesized image, and applying a light filter.

14. The method of claim 10 further comprising:
training the machine learning model based on the synthesized images.

15. The method of claim 10 further comprising:
providing the machine learning model to an image search system.

16. The method of claim 10 further comprising:
receiving, from a user equipment, a query including an image depicting an item.

17. The method of claim 16 further comprising: performing an image search for one or more catalog images that match the image of the received query, wherein the machine learning model is trained based on the collection of synthesized images to identify the one or more catalog images; and responding to the query by providing the one or more catalog images to the user equipment.

18. The method of claim 10, wherein the foreground object image is extracted from a catalog image received from a database including the plurality of catalog images.

19. A non-transitory computer-readable storage medium including program code which when executed causes operations comprising:
selecting one or more image preprocessing transformations to apply on the foreground object image;
applying the selected one or more image preprocessing transformations to the foreground object image;
selecting a background image from a set of background images depicting a variety of different backgrounds which may be associated with the foreground object image;
merging the selected background image with the foreground object image to form a synthesized image;
selecting one or more image transformations to apply on the synthesized image;
applying the selected one or more image transformations to the synthesized image; and
storing the synthesized image in a collection of synthesized images to train a machine learning model to identify, from a plurality of catalog images, one or more catalog images that match a query image received from a user.

20. The non-transitory computer-readable storage medium of claim 19, wherein the one or more image preprocessing transformations include one or more of the following: varying a color of the foreground object image, varying a brightness of the foreground object image, varying a contrast of the foreground object image, rotating the foreground object image, scaling a size of the foreground object image, varying a transparency of the foreground object image, and blurring the foreground object image.

* * * * *